Nov. 25, 1947.  C. W. BONDURANT  2,431,457
RELIEF VALVE
Filed March 13, 1943
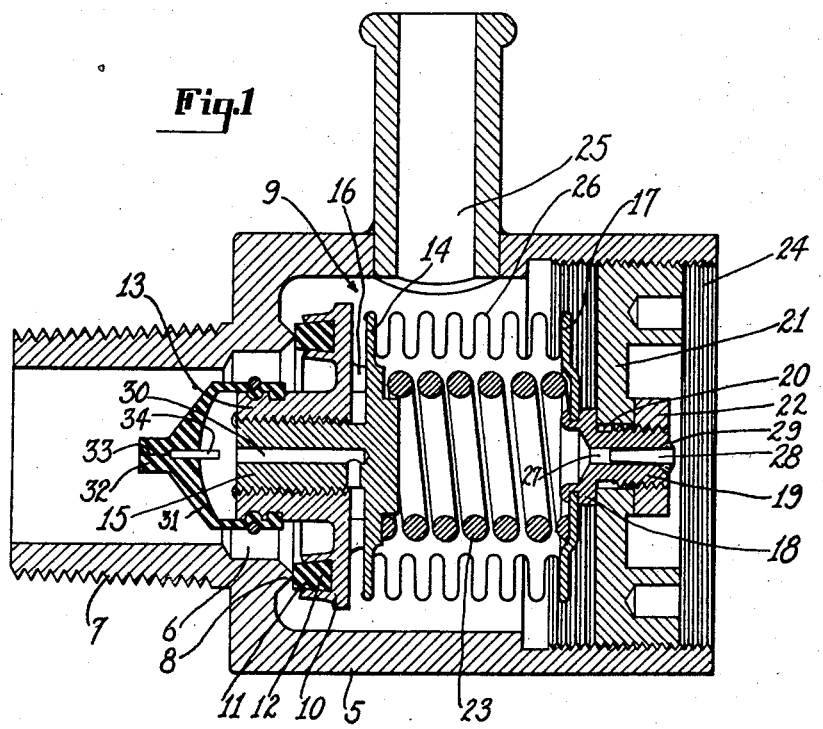
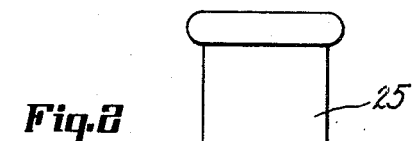
INVENTOR
CARLTON W. BONDURANT
BY
ATTORNEY Patented Nov. 25, 1947

2,431,457

UNITED STATES PATENT OFFICE 2,431,457

RELIEF VALVE

Carlton W. Bondurant, Dayton, Ohio, assignor to Standard-Thomson Corporation, a corporation of Delaware Application March 13, 1943, Serial No. 479,035

3 Claims. (Cl. 277—45)

This invention relates to a relief valve and is designed more particularly for use on the storage tank of the liquid cooling system for the engine of an airplane, but is not limited to such use.

The ordinary relief valve is subject to atmospheric pressure and the tank pressure at which it will open varies with variations in atmospheric pressure. Atmospheric pressure decreases as altitude increases and the rate of decrease is not uniform but increases as the altitude increases, that is, for example, the decrease in atmospheric pressure between altitudes of twenty thousand feet and twenty-five thousand feet is much greater than the decrease between altitudes of five thousand feet and ten thousand feet One object of the invention is to provide a relief valve which will open under the same tank pressure at all altitudes.

A further object of the invention is to provide a relief valve which will not be affected by variations in atmospheric pressure and will open at the same tank pressure regardless of such variations.

A further object of the invention is to provide such a relief valve which will automatically admit air to the tank in the event tank pressure falls substantially below atmospheric pressure at any altitude.

A further object of the invention is to provide such a relief valve which will be simple in construction, reliable in operation and can be produced at low cost.

Other objects of the invention may appear as it is described in detail.

In the accompanying drawing Fig. 1 is a longitudinal section taken centrally through a relief valve embodying my invention; and Fig. 2 is an end elevation of the valve of Fig. 1.

In these drawings I have illustrated one embodiment of my invention, which embodiment is designed primarily for attachment to the supply tank of the liquid cooling system for the engine of an airplane, but it is to be understood that the invention may take various forms and may be used in connection with various apparatus in which pressure relief is desirable, and that the term "tank," as herein used, is intended to include any receptacle or conduit adapted to contain fluid under pressure.

The invention comprises a structure having a port to communicate with a source of fluid pressure, such as a tank, and adapted to support the valve elements and controlling means therefor. In the arrangement here illustrated this structure is in the form of a cylindrical casing 5 having at the forward end thereof a port 6 and a screw threaded nipple 7 to connect the casing with a tank and place the port in communication with the interior of the tank, which constitutes the source of fluid under pressure. Extending about the port 6 within the casing is a valve seat 8 which is preferably V-shaped in cross section to provide the same with a narrow edge to contact the movable valve member. Supported in the rear of the port 6 is a valve member which is movable into and out of engagement with the valve seat 8. This valve member is indicated as a whole by the reference numeral 9 but to facilitate manufacture and assembly it is preferably formed of two parts rigidly connected one with the other for movement in unison. The forward part or body portion of the valve member is in the form of a disk 10 having on its forward side, that is, the side adjacent the valve seat 8, a channel 11 to receive and support a sealing ring 12 which contacts with the valve seat. This body portion also has a central forwardly extending boss 13 provided with an internal screw thread. The second or rear part of the valve member is also in the form of a disk, as shown at 14, but is not necessarily circular in form. It is provided with a central forwardly extending stud 15 which extends into and has screw threaded connection with the boss 13 of the body portion of the valve member. The body portion 10 of the valve member has on its rear surface segmental ribs 16 to space the two parts thereof one from the other, for a purpose which will hereinafter appear.

Supported in the casing adjacent the rear end thereof and held normally against movement with relation to the casing is an abutment 17, which is here shown in the form of a disk but is not necessarily circular in form. The abutment, or disk, may be mounted in the casing in any suitable manner, and preferably is rigidly secured to the head 18 of a stud 19 which extends through an opening 20 in a supporting member 21, which, in the present instance, also constitutes a closure for the rear end of the casing. The rear end of the stud 19 is screw threaded to receive a nut 22 which maintains the connection between the stud and the supporting member. Confined between the disk 14 of the valve member and the abutment or disk 17 is means to urge the valve member toward and yieldably retain the same in engagement with the valve seat 8. This yieldable means may take various forms but, as here shown, it comprises a single coiled spring 23 confined between the two disks. The rear disk or abutment 17 is adjustable toward and from the valve member to increase or decrease the compression of the spring and thereby vary the tank pressure necessary to open the valve against the action of the spring. In the present construction this adjustment of the abutment is effected by moving the supporting member or closure 21 lengthwise of the casing, the supporting member being preferably provided with peripheral screw threads to engage internal screw threads 24 in the end portion of the casing. It is desirable that the abutment 17 should be adjustable toward and from the valve member without imparting rotation to the abutment. Therefore, the supporting member or closure 21 is rotatable about the stud 19. The nut 22 may be normally so adjusted as to permit the rotation of the supporting member on the stud without permitting appreciable axial movement of the stud with relation thereto, or the nut may be tightened down to firmly clamp the stud to the supporting member and the nut then loosened sufficiently to permit rotation of the supporting member about the stud when adjustment is to be effected.

The interior of the casing is in open communication with the atmosphere and the casing may be of any suitable construction which will permit of such communication and at the same time provide means for supporting the abutment 17 in the proper position with relation to the valve member. When, as in the present instance, the casing has a continuous cylindrical wall, the interior thereof may be placed in communication with the atmosphere by an opening, here shown as provided with a nipple 25 which may, if desired, be connected with a tube.

When the rear surface of the valve member is subject to atmospheric pressure that pressure provides part of the resistance to the opening movement of the valve member under tank pressure. Consequently an increase or decrease in atmospheric pressure modifies the total resistance offered to the opening movement of the valve member and the latter will open under different tank pressures at different altitudes. To prevent the valve member from opening under different tank pressures at different altitudes I have provided means for preventing atmospheric pressure from acting on the valve member, so that the spring means provides the whole of the resistance to the opening movement of the valve member. For this purpose I have provided means whereby a portion of the rear surface of the valve member may be so enclosed that it will not be subject to atmospheric pressure, the portion so enclosed being of an area substantially equal to the area of the port 6 at the contact edge of the valve seat. The enclosure is preferably in the form of a hermetically sealed extensible housing enclosing the spring means as well as a portion of the rear surface of the valve member. In the preferred construction the housing is in the form of a cylindrical bellows 26, of the type sold under the name of "Sylphon," and this bellows is connected at its respective ends with the disks 14 and 17, the connections being soldered or otherwise tightly sealed. The rear disk 17 forms a part of the housing and its connection with the stud 19 is also tightly sealed. The bellows is concentric with the axis of the valve seat and the effective diameter thereof is defined by median lines extending through the folds thereof and this effective diameter is substantially equal to the inner diameter of the valve seat at its contact edge. Consequently that portion of the rear surface of the valve member which is enclosed by the bellows has an effective area substantially equal to the area of the port 6 at the contact edge of the valve seat. The exterior surface of the housing and the exposed parts of the valve member are such that the atmospheric pressure thereon is substantially equalized and balanced out. Therefore atmospheric pressure has no effect whatever upon the movement of the valve member from its closed position and that member will open at all altitudes under a tank pressure sufficient to compress the spring 23.

In some installations it may be desirable for the valve to open at high altitudes at a tank pressure slightly different from the tank pressure under which it normally opens. This may be accomplished, without otherwise changing the apparatus, by increasing or decreasing the diameter of the valve seat and thus increasing or decreasing the effective area of the valve member which is exposed to tank pressure only.

It may also in some cases be desirable to evacuate the air from the interior of the bellows so that the spring means will function substantially in a vacuum. To enable this to be done the stud 19 is provided with an opening 27 by means of which the bellows may be evacuated and the opening 27 then sealed, as by means of a plug 28 which is inserted in the opening and then soldered to the stud, as shown at 29. When the bellows is filled with air or other gaseous fluid this fluid must be compressed more or less when the valve opens and thus adds to the resistance offered by the spring to the opening of the valve, and this resistance changes as the fluid contracts and expands due to variations in temperature. By partially evacuating the bellows the resistance of the air to the opening of the valve is reduced and the effect of the contraction and expansion of the fluid is also reduced, thus tending to maintain a substantially uniform resistance to the opening of the valve at all temperatures. Preferably the evacuation is as complete as is practical so that such fluid as may remain in the bellows has no appreciable effect on the valve at any temperature and the valve becomes more highly sensitive to pressure changes.

Under some conditions of operation the pressure in the tank of the cooling system may fall so far below atmospheric pressure as to endanger the tank or other parts of the system. To avoid this danger the relief valve is provided with means for automatically admitting air to the tank when the pressure within the tank falls substantially below atmospheric pressure at any altitude. For this purpose I prefer to provide the valve member with an opening to connect the interior of the tank with the atmosphere, and to control the flow of fluid through this opening by a check valve which opens toward the tank. In the present construction the stud 15 of the valve member is provided with a longitudinal bore 30 which communicates with the atmosphere through the space between the parts 10 and 14 of the valve member, the segmental spacing ribs 16 being spaced one from the other to permit of this communication. The check valve may be of any suitable character but with the present construction I prefer to provide a check valve consisting of a cup-shaped member 31 formed of a soft rubber composition. The open end of this cup-shaped structure extends about and is rigidly secured to the boss 13 of the valve member. The end wall of the cup-shaped structure is thickened toward its center and provided with a projection 32 having a thin slit 33 opening through both ends of the projection and communicating with a segmental groove 34 in the inner surface of the end wall. Normal tank pressure acting on the exterior surfaces of the cup-shaped structure will press the side walls of the slit 33 one against the other and tightly close the check valve so as to prevent the escape of fluid from the tank but if tank pressure falls materially below atmospheric pressure, the atmospheric pressure acting on the interior of the check valve will distort the wall thereof so as to separate the side walls of the slit 33 and thus open the check valve and permit air to enter the tank until tank pressure is approximately equal to atmospheric pressure.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. A relief valve comprising a casing having at one end thereof a port to communicate with a source of fluid under pressure, and a valve seat extending about said port, a movable valve member cooperating with said valve seat, a supporting element having screw threaded connection with said casing adjacent the other end thereof for adjustment lengthwise of said casing and having an opening therethrough, a stud supported in and extending through said opening and connected with said supporting element for axial movement therewith, said supporting element being rotatable about said stud, a disk rigidly secured to said stud in opposed relation to said valve member, spring means confined between said disk and said valve member to urge the latter toward said valve seat, and a bellows extending about said spring means concentric with the axis of said valve, having at its ends sealed connection with said valve member and having an effective diameter substantially equal to the effective diameter of said valve seat.

2. A relief valve comprising a casing having at one end thereof a port to communicate with a source of fluid under pressure, and a valve seat extending about said port, a movable valve member cooperating with said valve seat, a supporting element having screw threaded connection with said casing adjacent the other end thereof for adjustment lengthwise of said casing and having an opening therethrough, a stud supported in and extending through said opening and connected with said supporting element for axial movement therewith, said supporting element being rotatable about said stud, a disk rigidly secured to said stud in opposed relation to said valve member, spring means confined between said disk and said valve member to urge the latter toward said valve seat, a bellows extending about said spring means concentric with the axis of said valve, having at its ends sealed connection with said valve member and said disk and having an effective diameter substantially equal to the effective diameter of said valve seat, said stud having an opening through which said bellows may be evacuated, and means for sealing the opening in said stud.

3. A relief valve comprising a structure having a port to communicate with a source of fluid pressure, and a valve seat extending about said port, a movable valve member including a body portion having a sealing element to engage said valve seat and a disk secured to said body portion, a second disk supported by said structure in opposed relation to the disk of said valve member and spaced therefrom, spring means confined between said disks to urge said valve member toward said valve seat, a bellows extending about said spring means concentric with the axis of said valve seat, having sealed connection at its ends with said disks and having an effective diameter substantially equal to the effective diameter of said valve seat, the body portion and disk of said valve member being spaced one from the other and said body portion having a port to connect said source of pressure with the space between said body portion and said disk, and a check valve to control the flow of fluid through said port, said check valve opening toward said source of pressure.

CARLTON W. BONDURANT.

REFERENCES CITED

The following references are of record in the file of this patent:

UNITED STATES PATENTS

| Number | Name | Date |
|---|---|---|
| 1,051,554 | Champion | Jan. 28, 1913 |
| 1,930,107 | Rang | Oct. 10, 1933 |
| 1,981,965 | Morgan | Nov. 27, 1934 |
| 1,995,480 | Murphy | Mar. 26, 1935 |
| 2,266,314 | Eshbaugh | Dec. 16, 1941 |
| 2,283,513 | Smith | May 19, 1942 |
| 2,290,059 | Martin-Hurst | July 14, 1942 |
| 2,313,149 | Jacobsson | Mar. 9, 1943 |
| 2,345,547 | Roth | Mar. 28, 1944 |
| 2,366,146 | Martin-Hurst | Dec. 26, 1944 |